US009046969B2

(12) United States Patent
Kamaeguchi et al.

(10) Patent No.: US 9,046,969 B2
(45) Date of Patent: Jun. 2, 2015

(54) INPUT DEVICE

(75) Inventors: Shinji Kamaeguchi, Osaka (JP);
Tamotsu Yamamoto, Hyogo (JP);
Hiroyasu Okada, Hyogo (JP); Takaya Nakamura, Osaka (JP); Naoyuki Takagi, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 632 days.

(21) Appl. No.: 13/110,961

(22) Filed: May 19, 2011

(65) Prior Publication Data

US 2011/0298735 A1 Dec. 8, 2011

(30) Foreign Application Priority Data

Jun. 3, 2010 (JP) ................................. 2010-127471

(51) Int. Cl.
*G06F 3/044* (2006.01)
*G06F 3/041* (2006.01)
*G06F 3/0488* (2013.01)

(52) U.S. Cl.
CPC .............. *G06F 3/044* (2013.01); *G06F 3/0416* (2013.01); *G06F 3/04886* (2013.01); *G06F 2203/04101* (2013.01); *G06F 2203/04805* (2013.01)

(58) Field of Classification Search
USPC .................. 345/173, 156, 104; 178/18.01
See application file for complete search history.

(56) References Cited

U.S. PATENT DOCUMENTS

| 5,552,568 | A  | * | 9/1996  | Onodaka et al. ........... 178/18.03 |
|-----------|----|---|---------|-------------------------------------|
| 5,929,834 | A  | * | 7/1999  | Inoue et al. .................... 345/104 |
| 7,236,161 | B2 |   | 6/2007  | Geaghan et al. |
| 8,115,499 | B2 | * | 2/2012  | Osoinach et al. ............. 324/686 |
| 2006/0097976 | A1 | * | 5/2006  | Lee et al. .......................... 345/98 |
| 2008/0048952 | A1 | * | 2/2008  | Hanaki et al. .................... 345/82 |
| 2008/0122798 | A1 |   | 5/2008  | Koshiyama et al. |
| 2008/0278178 | A1 | * | 11/2008 | Philipp ......................... 324/662 |
| 2008/0309631 | A1 | * | 12/2008 | Westerman et al. .......... 345/173 |
| 2009/0267916 | A1 | * | 10/2009 | Hotelling ....................... 345/174 |
| 2010/0020032 | A1 | * | 1/2010  | Mamba et al. ................ 345/173 |
| 2010/0194695 | A1 | * | 8/2010  | Hotelling et al. ............. 345/173 |
| 2010/0283752 | A1 | * | 11/2010 | Maeda .......................... 345/173 |
| 2011/0163983 | A1 | * | 7/2011  | Maki ............................. 345/173 |

FOREIGN PATENT DOCUMENTS

| JP | 2006-520970 | 9/2006 |
| JP | 2008-117371 | 5/2008 |
| JP | 2009-258903 | 11/2009 |
| WO | 2009/090534 | 7/2009 |

* cited by examiner

*Primary Examiner* — Srilakshmi Kumar
*Assistant Examiner* — Linh N Hoffner
(74) *Attorney, Agent, or Firm* — Wenderoth, Lind & Ponack, L.L.P.

(57) ABSTRACT

An input device includes an electrode part, a switching circuit, a driving circuit, a detecting circuit, and a controller. The electrode part includes a plurality of electrode pieces. The switching circuit is formed of a plurality of switches connected to the electrode pieces respectively. The driving circuit and the detecting circuit are connected to the electrode part via the switching circuit. The controller is connected to the driving circuit, the switching circuit, and the detecting circuit. The controller controls the respective switches such that the electrode pieces are individually opened or connected to one of the driving circuit and the detecting circuit.

8 Claims, 9 Drawing Sheets

INPUT DEVICE

BACKGROUND OF THE INVENTION

1. Field of the Invention

The present invention relates to an input device used for operating various electronic apparatuses.

2. Background Art

Electronic apparatuses such as mobile phones and music players have become more functional and more compact in recent years. In line with this trend, there is a growing demand for input devices that perform diverse operations in electronic apparatuses. One such conventional input device will be described as follows with reference to FIGS. 8 and 9.

FIG. 8 is a sectional view of conventional input device 15. FIG. 9 is an exploded perspective view of electronic apparatus 20 using input device 15. In these drawings, the dimensions of some parts are exaggerated to facilitate understanding. Electronic apparatus 20 includes input device 15, upper casing 16, lower casing 17, and panel sheet 18.

Input device 15 includes touch panel 6, display element 7, damper sheet 8, and wiring board 9. Touch panel 6 is a capacitance type. Display element 7 can be a liquid crystal display element. Damper sheet 8 can be made of rubber. Wiring board 9 is provided on its upper and lower surfaces with wiring patterns (not shown). Display element 7 and touch panel 6 are stacked in that order on the top surface of wiring board 9 via damper sheet 8.

Touch panel 6 includes upper surface cover 1, upper substrate 2, and lower substrate 3, all of which are made of light-transmissive glass or light-transmissive resin. Touch panel 6 further includes upper electrodes 4 on the top surface of upper substrate 2. Upper electrodes 4 are belt-shaped and made of a light-transmissive material such as indium tin oxide. Upper substrate 2 is bonded to upper surface cover 1 via an adhesive (not shown) applied to the top surface of upper substrate 2 and/or the top surface of upper electrodes 4.

Touch panel 6 further includes lower electrodes 5 on the top surface of lower substrate 3 so as to be at right angles with respect to upper electrodes 4. Lower electrodes 5 are also belt-shaped and made of a light-transmissive material such as indium tin oxide. Lower substrate 3 is bonded to the bottom surface of upper substrate 2 via an adhesive (not shown) applied to the top surface of lower substrate 3 and/or the top surface of lower electrodes 5.

Input device 15 further includes controller 10, detecting circuit 11, driving circuit 12, and connector 13 on the top surface of wiring board 9. Controller 10 is a semiconductor device such as a microcomputer. Detecting circuit 11 and driving circuit 12 are formed of electronic components such as resistors and diodes, and are connected to controller 10 via wiring patterns.

In input device 15, upper and lower electrodes 4 and 5 of touch panel 6 and display element 7 are electrically connected to controller 10, detecting circuit 11, and driving circuit 12 via connector 13, film-like flexible wiring board 14 having wiring patterns, and other components.

Upper and lower casings 10 and 17 are made of insulating resin, each of which is shaped like, a box. Film-like panel sheet 18 is pasted on the top surface of upper casing 16. Touch panel 6, display element 7, and wiring board 9 connected to other electronic components and batteries (not shown) are housed between upper casing 16 and lower casing 17 in electronic apparatus 20.

Assume that a menu (not shown) including icons is displayed on display element 7 on the rear surface of touch panel 3 and that a user places a finger on the portion of the top surface of upper surface cover 1 that is on a desired icon. Then, part of the electric fields discharged from upper and lower electrodes 4 and 5 connected to driving circuit 12 is absorbed into the finger.

This results in changes in the electric field. The changes are detected by detecting circuit 11 connected to upper and lower electrodes 4 and 5. Controller 10 detects the finger contact position from the detection result of detecting circuit 11, and then selects the icon desired by the user. Display element 7 displays the application for the selected icon.

If it is desired to detect that the user brings a finger close to the top surface of upper surface cover 1, driving circuit 12 can be made to generate a larger electric field. In this case, the electric field is discharged far beyond the top surface of upper surface cover 1, allowing detecting circuit 11 to detect changes in the electric field due to the approach of the finger.

Thus, in the conventional input device, detecting circuit 11 detects changes in the electric field generated by driving circuit 12, and then controller 10 detects the position on which the user places a finger, or toward which the user moves a finger.

In the conventional input device, however, the user may fail to locate the exact position when the menus and keys are small compared with the size of his/her finger. This makes it difficult for input device 40 to perform diverse operations. Such an inconvenience occurs when the user selects a desired menu or key on display element 7 including a number of menus and a small QWERTY keyboard.

SUMMARY OF THE INVENTION

An input device includes an electrode part, a switching circuit, a driving circuit, a detecting circuit, and a controller. The electrode part includes a plurality of electrode pieces. The switching circuit is formed of a plurality of switches connected to the electrode pieces respectively. The driving circuit and the detecting circuit are connected to the electrode part via the switching circuit. The controller is connected to the driving circuit, the switching circuit, and the detecting circuit. The controller controls the respective switches such that the electrode pieces are individually opened or connected to one of the driving circuit and the detecting circuit. The controller allows generating an electric field over at least one electrode piece connected to the driving circuit, of the electrode pieces. The electric field is applied to the detecting circuit through at least one electrode piece connected to the detecting circuit, of the electrode pieces, via a space over the electrode part. Based on the detection result of the detecting circuit, the controller determines an electrode piece to which the object to be detected has gotten close among the electrode pieces.

DETAILED DESCRIPTION OF THE INVENTION

Figure 1:
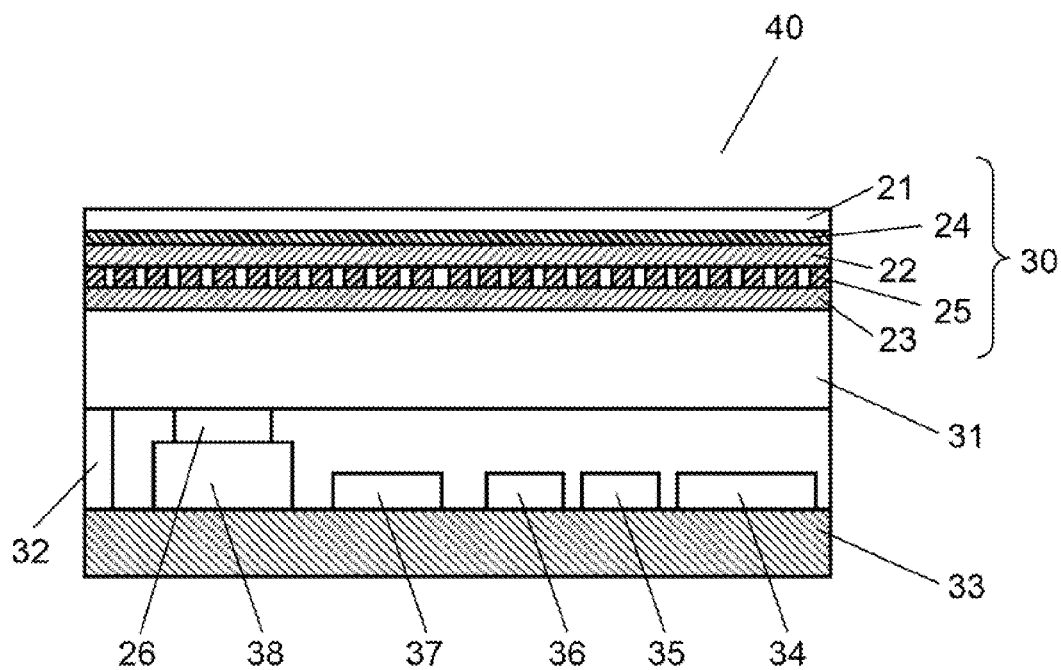
FIG. 1 is a sectional view of an input device, according to an embodiment of the present invention.
Figure 2:
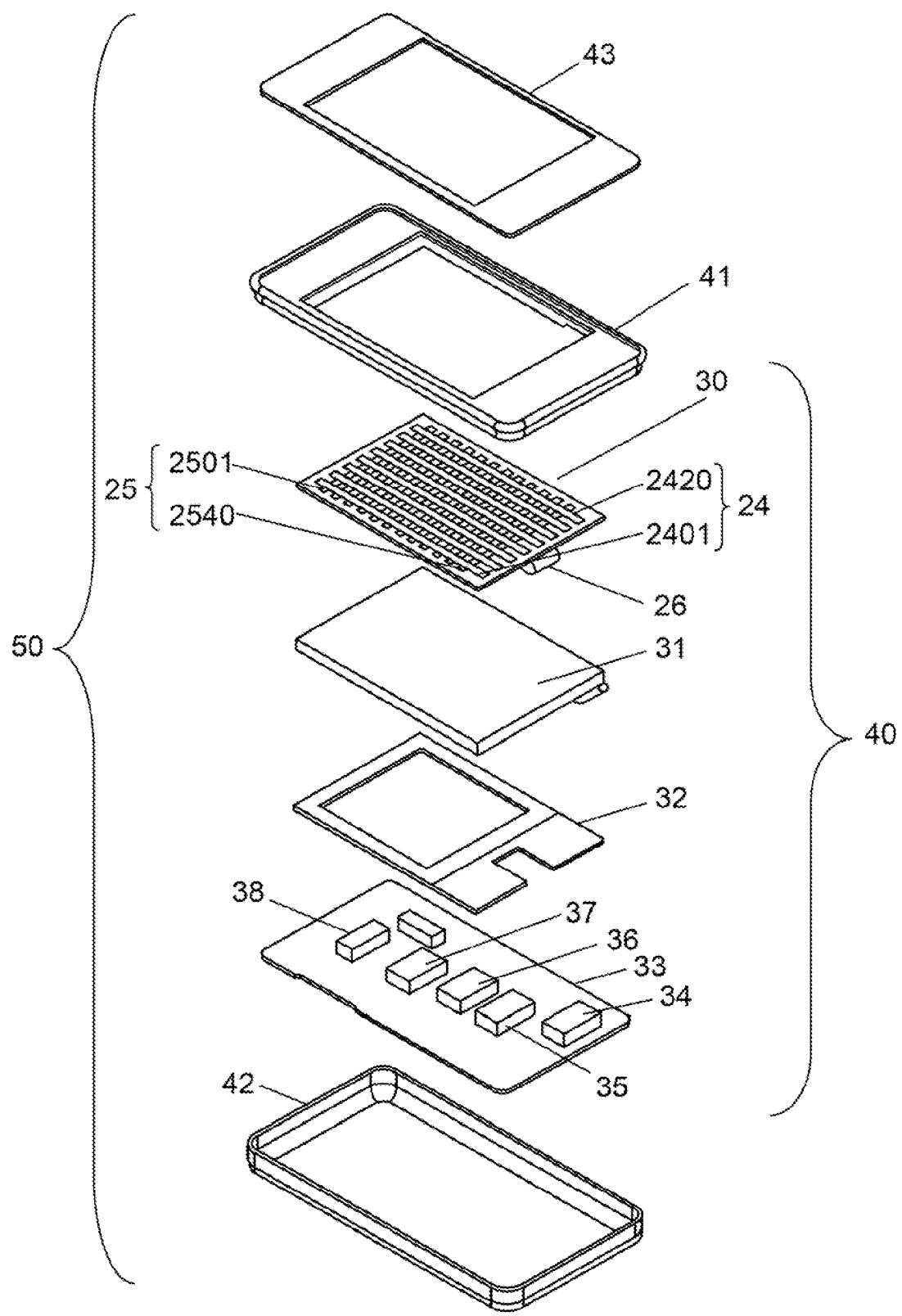
FIG. 2 is an exploded perspective view of an electronic apparatus using the input device shown in FIG. 1.

FIG. 1 is a sectional view of input device 40 of an embodiment of the present invention. FIG. 2 is an exploded perspective view of electronic apparatus 50 using input device 40. In these drawings, the dimensions of some parts are exaggerated to facilitate understanding. Electronic apparatus 50 includes input device 40, upper casing 41, lower casing 42, and panel sheet 43.

Input device 40 includes touch panel 30, display element 31, damper sheet 32, and wiring board 33. Touch panel 30 is a capacitance type. Display element 31 can be a liquid crystal display element. Damper sheet 32 is made of rubber or the like. Wiring board 33 is provided on its upper and lower surfaces with wiring patterns (not shown). Display element 31 and touch panel 30 are stacked in that order on the top surface of wiring board 33 via damper sheet 32.

Touch panel 30 includes upper surface cover 21, upper substrate 22, and lower substrate 23 as shown in FIG. 1, all of which are made of light-transmissive glass, light-transmissive resin, or the like. Examples of the light-transmissive resin include polyethylene terephthalate, polyethersulfone, and polycarbonate. Touch panel 30 further includes upper electrode part 24 on the top surface of upper substrate 22. Upper electrode part 24 is formed of upper electrode pieces 2401-2420, which are belt-shaped and arranged in the front-and-back direction. Upper electrode pieces 2401-2420 are made of a light-transmissive material such as indium tin oxide and tin oxide, by sputtering. Upper substrate 22 is bonded to upper surface cover 21 via an adhesive (not shown) applied to the top surface of upper substrate 22 and/or the top surface of upper electrode part 24.

Touch panel 30 further includes lower electrode part 25 on the top surface of lower substrate 23. Lower electrode part 25 is formed of lower electrode pieces 2501-2540, which are also belt-shaped and arranged in the right-and-left direction so as to be at right angles to upper electrode part 24. Lower electrode pieces 2501-2540 are made of a light-transmissive material such as indium tin oxide. Lower substrate 23 is bonded to the bottom surface of upper substrate 22 via an adhesive (not shown) applied to the top surface of lower substrate 23 and/or the top surface of lower electrode part 25.

Light-transmissive wirings (not shown) extend to the top surface of upper substrate 22 from the outer edges of upper electrode pieces 2401-2420. Similarly, light-transmissive wirings (not shown) extend to the top surface of lower substrate 23 from the outer edges of lower electrode pieces 2501-2540. These wirings are connected to wiring patterns on film-like flexible wiring board 26. Thus, touch panel 30 of capacitance type is configured. Touch panel 30 has 20 upper electrode pieces: 2401-2420, and 40 lower electrode pieces: 2501-2540, but the numbers of the electrode pieces are not limited to these.

Input device 40 further includes controller 34, detecting circuit 35, driving circuit 36, switching circuit 37, and connector 38 on the top surface of wiring board 33. Controller 34 may include a microcomputer. Detecting circuit 35 is a differential detection circuit which is formed of electronic components such as capacitors and diodes, and a differential circuit. Driving circuit 36 is formed of electronic components such as resistors and coils. Switching circuit 37 is one or more semiconductor device including switches 3701-3760. Detecting circuit 35, driving circuit 36, and switching circuit 37 are connected to controller 34 via the wiring patterns provided on the upper and lower surfaces of wiring board 33.

Upper electrode pieces 2401-2420 and lower electrode pieces 2501-2540 are connected to switches 3741-3760 and switches 3701-3740, respectively, of switching circuit 37 via flexible wiring board 26. Display element 31 is connected to the wirings provided on the upper and lower surfaces of wiring board 33 via connector 38. Thus, input device 40 is configured.

Upper and lower casings 41 and 42 shown in FIG. 2 are shaped like a box and made of insulating resin such as polystyrene and ABS. Film-like panel sheet 43 is pasted on the opening on the top surface of upper casing 41. Touch panel 30, display element 31, and wiring board 33 connected to other electronic components and batteries (not shown) are housed between upper casing 41 and lower casing 42 in electronic apparatus 30.

Figure 3A:
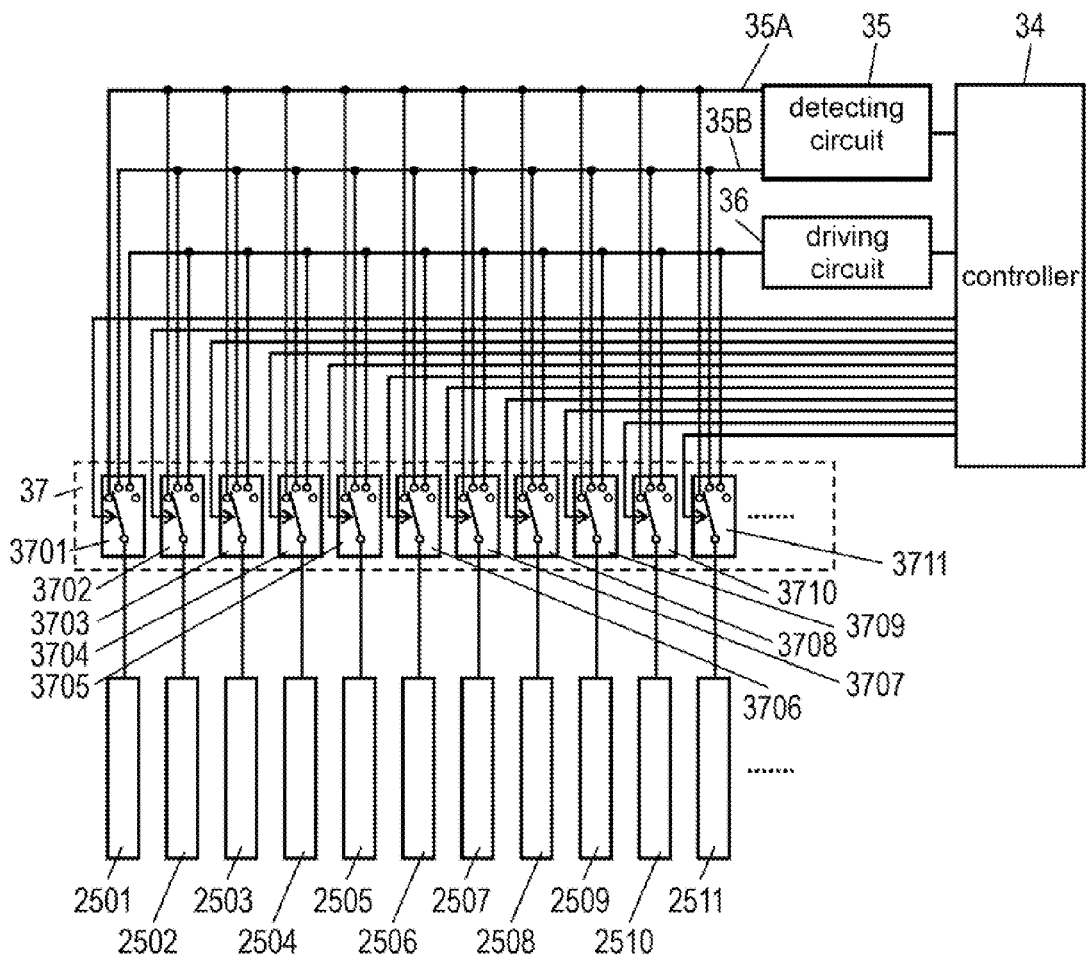
FIG. 3A is a circuit diagram of the input device shown in FIG. 1.
Figure 3B:
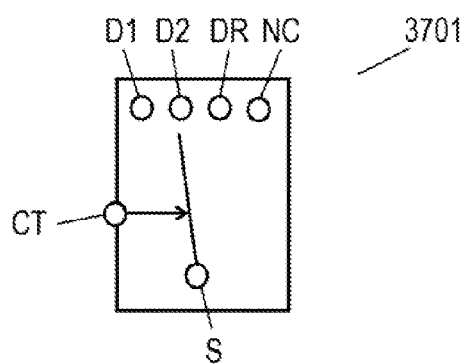
FIG. 3B is a circuit diagram of one of switches shown in FIG. 3A.

The following is a description, with reference to FIGS. 3A and 3B, of the electric connection in input device 40. FIG. 3A is a circuit diagram of input device 40. FIG. 3B is a circuit diagram of switch 3701 shown in FIG. 3A including several terminals. Switches 3702-3760 have the same structure as switch 3701.

FIG. 3A shows only lower electrode, pieces 2501-2511 electrically connected to switches 3701-3711, respectively, of switching circuit 37. The other electrode pieces: lower electrode pieces 2512-2540 and upper electrode pieces 2401-2420 are electrically connected in the same manner to switches 3712-3760, respectively.

As shown in FIG. 3B, switch 3701 includes terminals S, D1, DR, D2, NC, and CT. As shown in FIG. 3A, terminal S is electrically connected to lower electrode piece 2501. Terminal D1 is electrically connected to detection line 35A of detecting circuit 35. Terminal D2 is electrically connected to detection line 35B of detecting circuit 35. Terminal CT is connected to controller 34. Terminal DR is connected to driving circuit 36. Terminal NC is not electrically connected to other circuits, but is electrically open. Detecting circuit 35 and driving circuit 36 are electrically connected to controller 34.

Controller 34 controls switches 3701-3760 so as to electrically connect terminal S to one of terminals D1, D2, DR, and NC. This connection is changed individually, switch by switch, according to a control signal transmitted from controller 34 to terminal CT of each switch.

More specifically, each electrode piece (each of upper electrode pieces 2401-2420, and lower electrode pieces 2501-2540) is either electrically opened or electrically connected via controller 34 to one of driving circuit 36, detection line 35A and detection line 35B of detecting circuit 35. Thus, controller 34 switches the electric connection between each electrode piece and each circuit via switches 3701-3760.

Figure 5A:
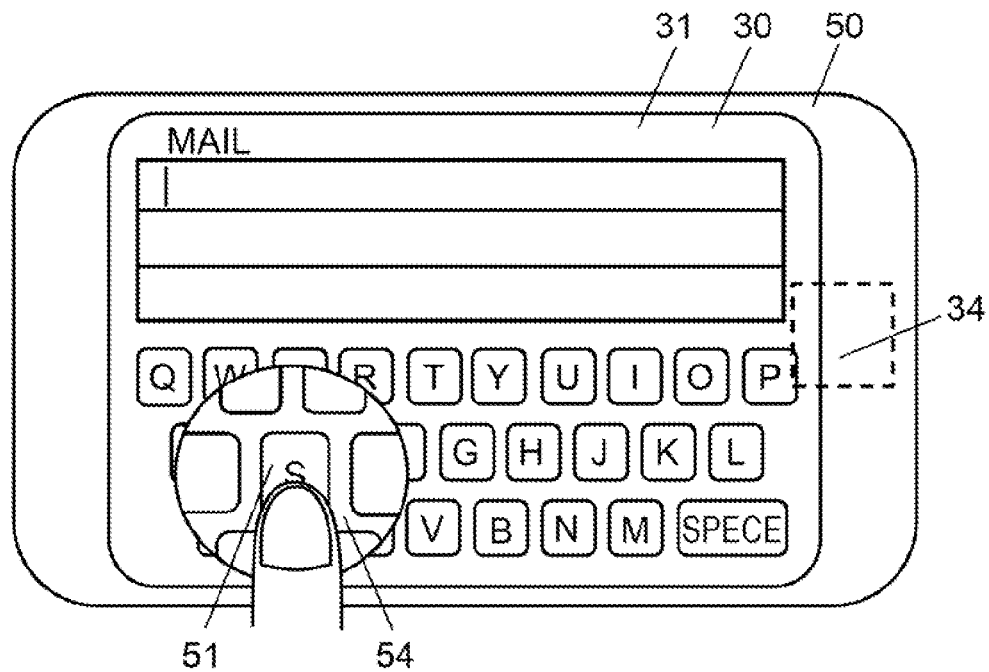
Figure 5B:
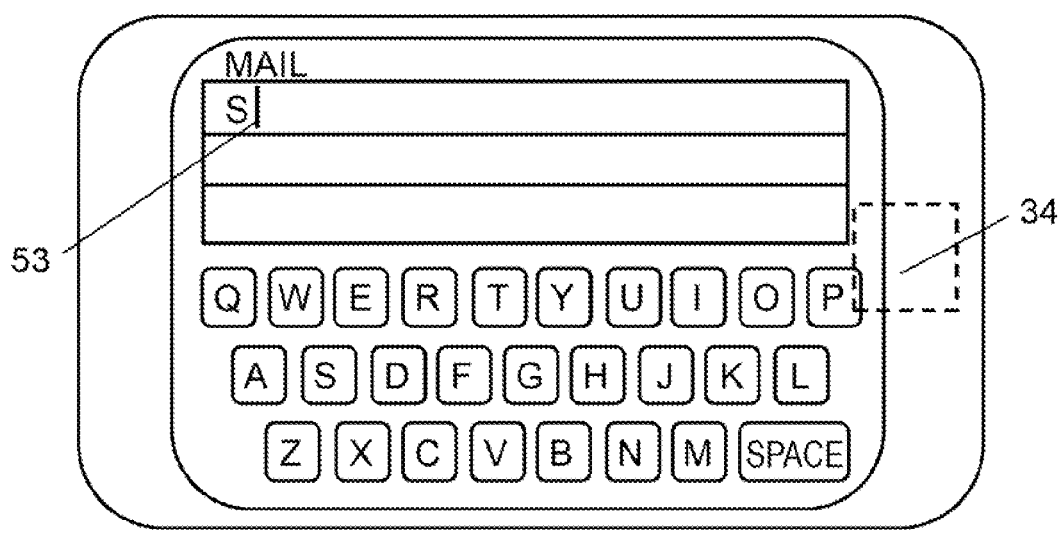
Figure 6:
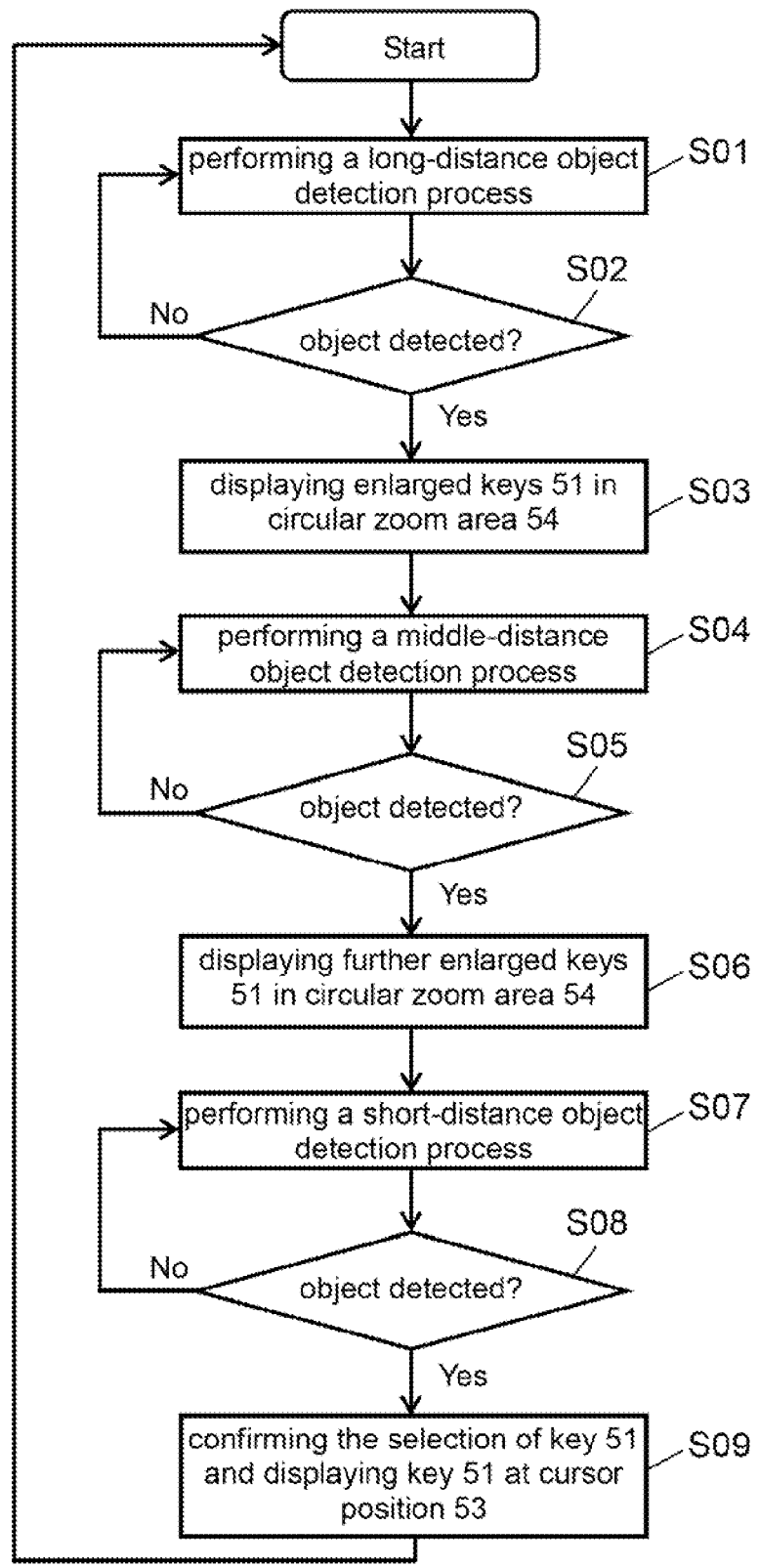
FIG. 6 is a flowchart, showing control operations of a controller of the input device shown in FIG. 1.
Figure 7:
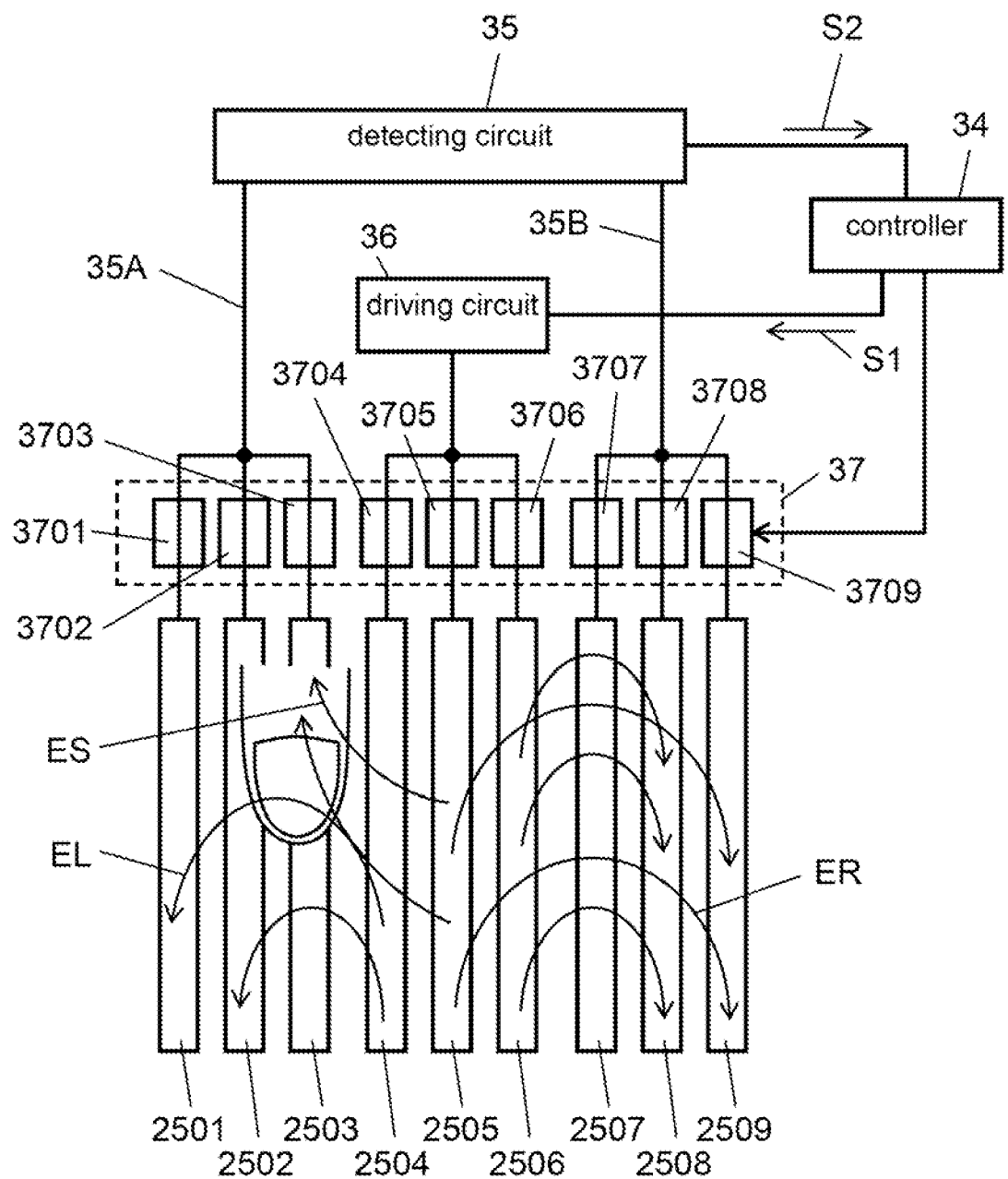
FIG. 7 is a conceptual view showing an operation of the input device shown in FIG. 1.
Figure 8:
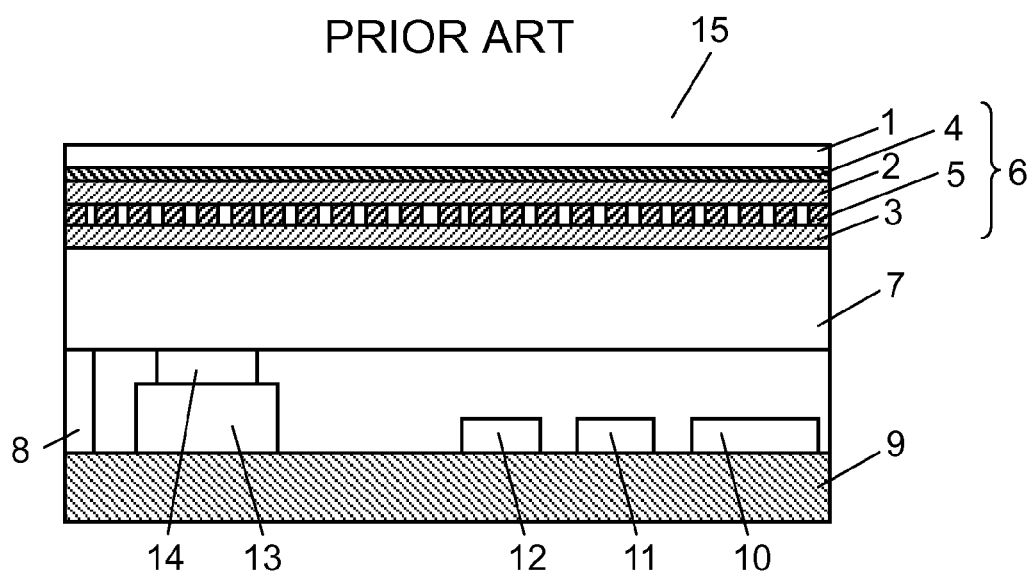
FIG. 8 is a sectional view of a conventional input device.
Figure 9:
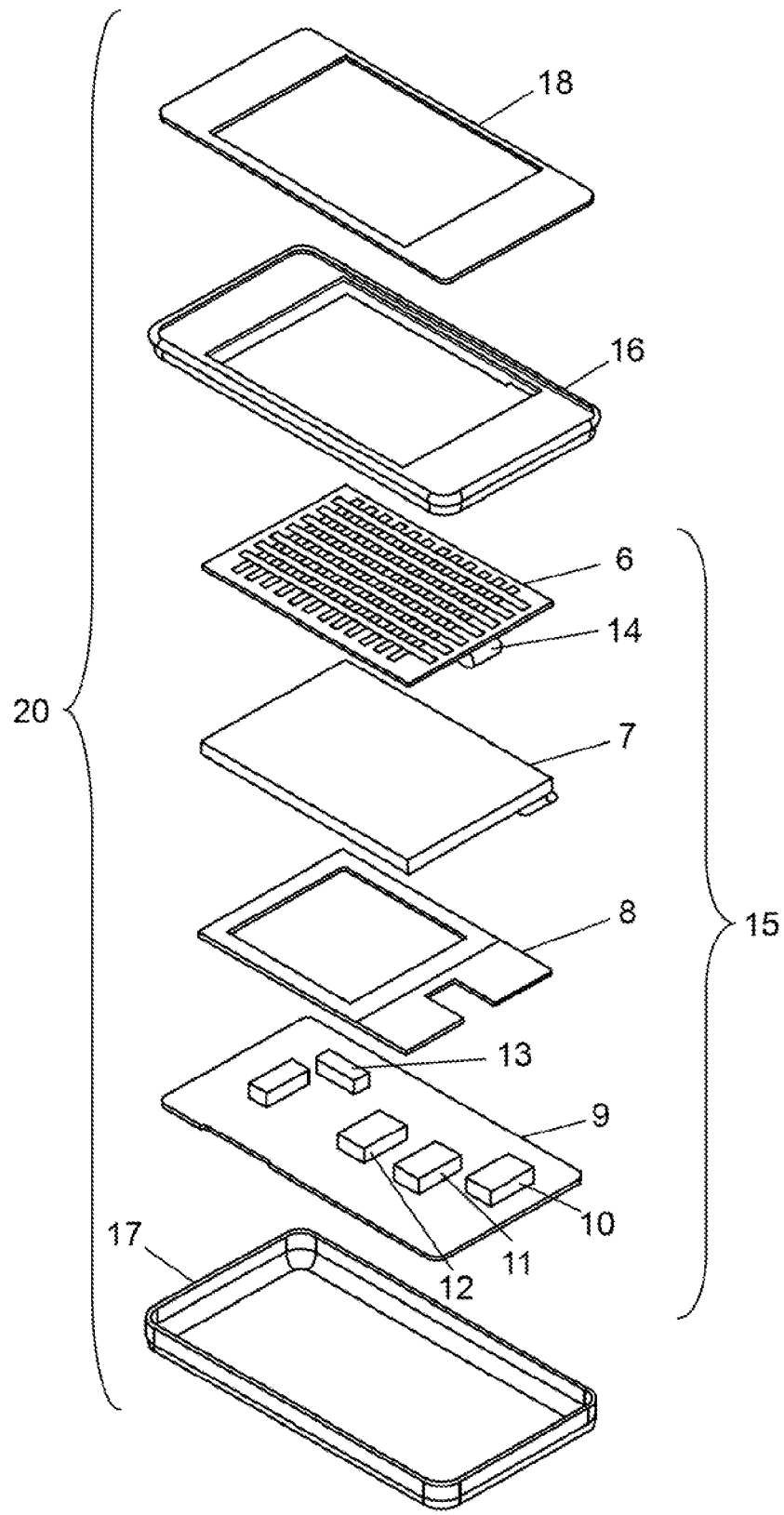
FIG. 9 is an exploded perspective view of an electronic apparatus using the input device shown in FIG. 8.

The operation of electronic apparatus 50 having input device 40 will be described as follows with reference to FIGS. 4A to 7. FIGS. 4A, 4B, 5A, and 5B are plan views showing a display of electronic apparatus 50. FIG. 6 is a flowchart showing the control operations of controller 34 of input device 40. FIG. 7 is a conceptual view showing the operation of input device 40. In the following description, a screen for creating an e-mail message is displayed on electronic apparatus 50.

Figure 4A:
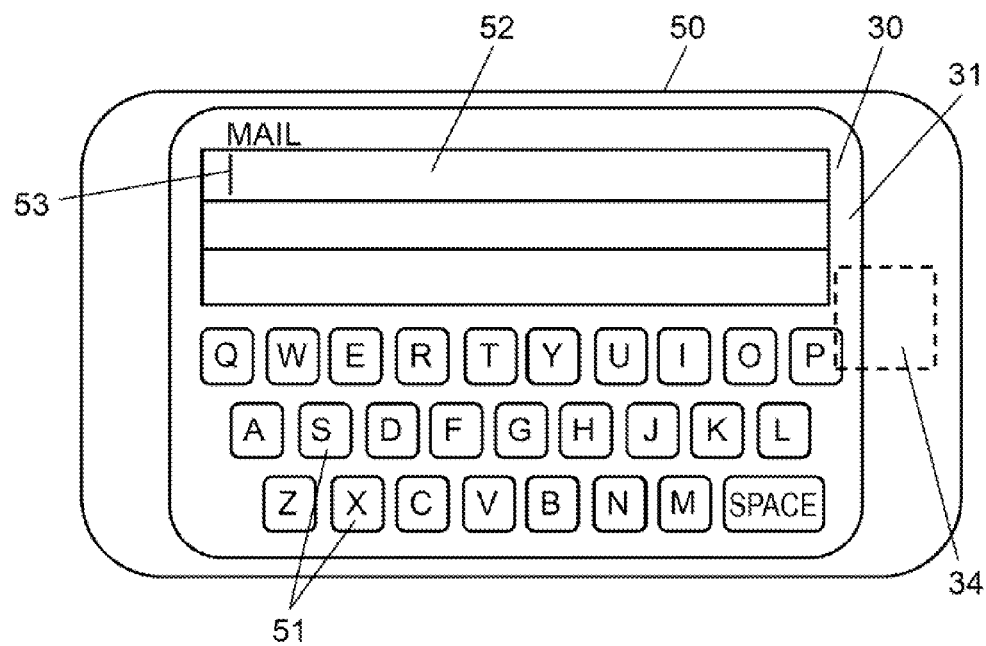
FIGS. 4A, 4B, 5A, and 5B are plan views each showing a display of the electronic apparatus shown in FIG. 2.

As shown in FIG. 4A, display element 31 on the rear surface of touch panel 30 displays QWERTY keys 51. Assume that a user is going to enter, for example, the letter "S" at cursor position 53 in e-mail creator 52. In this case, the user brings a finger close to key 51 for the letter "S" among keys 51.

At this moment, controller 34 performs a long-distance object detection process (Step S01) so as to detect whether or not the user's finger is present as an object (Step S02) as shown in FIG. 6. Controller 34 then controls display element 31 such that key 51 for the letter "S" and some neighboring keys 51 are enlarged and displayed in circular zoom area 54 shown in FIG. 4B (Step S03).

Assume that the user brings the finger closer to key 51 for the letter "S". In this case, controller 34 performs a middle-distance object detection process (Step S04) so as to detect whether or not the finger is present (Step S05) as shown in FIG. 6. Controller 34 they controls display element 31 such that key 51 for the letter "S" and closer neighboring keys 51 are further enlarged and displayed in smaller circular zoom area 54 shown in FIG. 5A (Step S06).

Assume that the user brings the finger much closer to key 51 for the letter "S" until the finger comes into contact with upper surface cover 21. In this case, controller 34 performs a short-distance object detection process (Step S07) so as to detect whether or not the finger is present (Step S08) as shown in FIG. 6. When the finger is detected, the selection of key 51 for the letter "S" is confirmed. Controller 34 then controls display element 31 such that the letter "S" is displayed at cursor position 53 as shown in FIG. 5B (Step S09).

When the user's finger as the object to be detected is getting closer to a menu or key 51, controller 34 controls the menus or keys 51 in a predetermined region to be displayed in an enlarged size. When the finger comes into contact with upper surface cover 21, controller 34 determines the menu or key 51 selected by the user. Thus, controller 34 detects the degree of approach of the object to be detected to touch panel 30, thereby allowing input device 40 to perform diverse operations.

The long-, middle-, and short-distance object detection processes shown in Steps S01, S04, and S07, respectively, will be described in detail as follows with reference to FIG. 7 and Tables 1 to 3.

In FIG. 7, controller 34 transmits drive signal S1 for generating an electric field to driving circuit 36. At the same time controller 34 controls switching circuit 37 such that the terminals in each switch connected to lower electrode part 25 are connected as follows. In switches 3701-3703, terminal S is connected to terminal D1. In switches 3704-3706, terminal S is connected to terminal DR. In switches 3707-3709, terminal S is connected to terminal D2. In switches 3710-3740, terminal S is connected to terminal NC, so that the electrode pieces connected to these switches are electrically opened as shown in time T0 in Table 1.

TABLE 1

| time | connection S-D1 | connection S-DR | connection S-D2 | connection S-NC |
| --- | --- | --- | --- | --- |
| T0 | switches 3701-3703 | switches 3704-3706 | switches 3707-3709 | switches 3710-3740 |
| T1 | switches 3702-3704 | switches 3705-3707 | switches 3708-3710 | switches 3711-3740, 3701 |

Upon receiving drive signal S1 from controller 34, driving circuit 36 discharges electric fields ER and EL from lower electrode pieces 2504-2506 connected to driving circuit 36 via switching circuit 37 to the space above.

When the user's finger is located over, for example, lower electrode pieces 2501-2503, part of electric field EL discharged to the left is absorbed as electric field ES. This results in a decrease in the electric field that is applied to lower electrode pieces 2501-2503 connected to detection line 35A of detecting circuit 35 via switching circuit 37. As a result, the capacitance decreases.

Electric field ER discharged to the right, on the other hand, is applied to lower electrode pieces 2507-2509 connected to detection line 35B of detecting circuit 35 via switching circuit 37. Since the user's finger is not located over lower electrode pieces 2507-2509, there is no decrease in electric field application, causing no change in the capacitance.

Detecting circuit 35, which is a differential detection circuit, generates comparison signal S2 indicating the ratio of the amount of the application of the electric field between lower electrode pieces 2501-2503 and lower electrode pieces 2504-2506. In other words, comparison signal S2 indicates that the finger is located on the lower electrode pieces 2501-2503 side from which a smaller electric field is applied. Upon receiving comparison signal S2, controller 34 detects the presence or absence of the user's finger by using the ratio of the amount of the application of the electric field of, for example, 10% or more as a threshold.

As described above, controller 34 controls switching circuit 37 such that every three lower electrode pieces are connected as follows. Lower electrode pieces 2501-2503 are connected to detection line 35A; lower electrode pieces 2504-2506 are connected to driving circuit 36; and lower electrode pieces 2507-2509 are connected to detection line 35B. In this case, the electric field to be discharged or absorbed is three times stronger than in the case of connecting every single lower electrode piece. This allows the detection of the presence of the user's finger in a comparatively long distance range.

Next, controller 34 controls switching circuit 37 such that the terminals in each switch are connected as shown in time T1 in Table 1 by shifting lower electrode pieces 2501-2540 connected to driving circuit 36 and detection lines 35A and 35B one by one in the right direction. Similarly, detecting circuit 35 generates comparison signal S2 based on the signals from detection lines 35A and 35B. Controller 34 detects the presence or absence of the user's finger. These operations are repeated from lower electrode piece 2501 on the left end to lower electrode piece 2540 on the right end on touch panel 30.

Figure 4B:
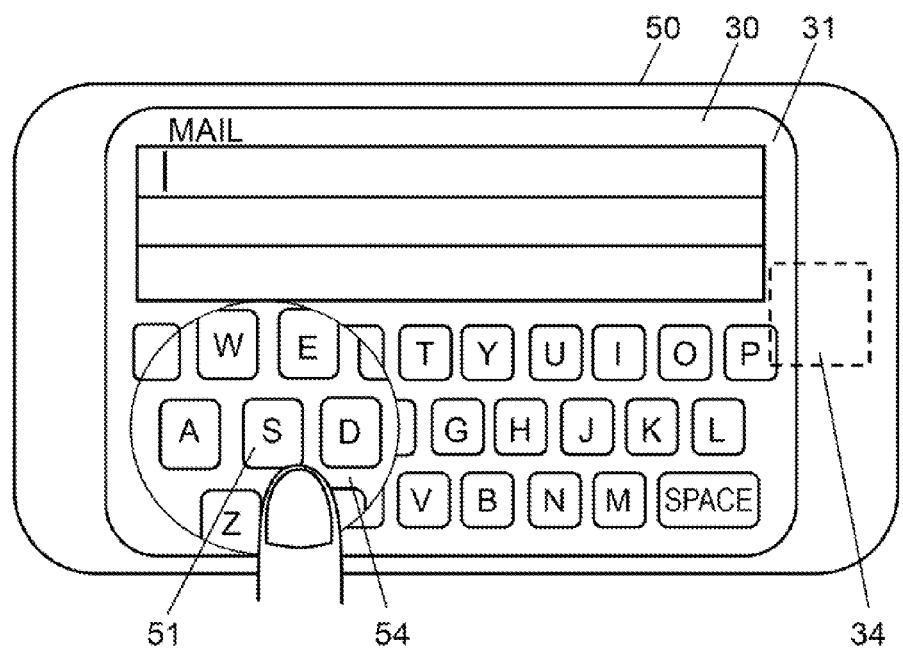

In the same manner as over lower electrode part 25, controller 34 detects the presence of the user's finger over upper electrode part 24 by shifting upper electrode pieces 2401-2420 one by one from electrode piece 2401 at the front end to electrode piece 2420 at the back end. Controller 34 then determines the position of the user's finger based on the front-and-back position in upper electrode part 24 and the right-and-left position in lower electrode part 25. Upon detecting the position of the finger, controller 34 controls display element 31, for example, as shown in FIG. 4B.

The following is a description of the middle-distance object detection process. In this case, controller 34 controls switching circuit 37 such that every two lower electrode pieces are connected to driving circuit 36 and detection lines 35A and 35B.

Assume that controller 34 has detected in the long-distance object detection process that the user's finger is located in lower electrode piece $25n$ corresponding to switch $37n$. The "n" is a positive integer, and when the number is one digit, the second digit is "0". In this case, in the middle-distance object detection process, controller 34 controls the switches in switching circuit 37 as follows as shown in time T2 in Table 2. In switches $37(n-5)$ and $37(n-4)$, terminal S is connected to terminal D1. In switches 37(n−3) and 37(n−2), terminal is connected to terminal DR. In switches 37(n−1) and 37n, terminal S is connected to terminal D2. In the remaining switches, terminal is connected to terminal NC.

TABLE 2

| time | connection S-D1 | connection S-DR | connection S-D2 | connection S-NC |
|---|---|---|---|---|
| T2 | switches 37(n − 5), 37(n − 4) | switches 37(n − 3), 37(n − 2) | switches 37(n − 1), 37n | the other switches |
| T3 | switches 37(n − 4), 37(n − 3) | switches 37(n − 2), 37(n − 1) | switches 37n, 37(n + 1) | the other switches |
| T4 | switches 37(n − 3), 37(n − 2) | switches 37(n − 1), 37n | switches 37(n + 1), 37(n + 2) | the other switches |
| T5 | switches 37(n − 2), 37(n − 1) | switches 37n, 37(n + 1) | switches 37(n + 2), 37(n + 3) | the other switches |
| T6 | switches 37(n − 1), 37n | switches 37(n + 1), 37(n + 2) | switches 37(n + 3), 37(n + 4) | the other switches |
| T7 | switches 37n, 37(n + 1) | switches 37(n + 2), 37(n + 3) | switches 37(n + 4), 37(n + 5) | the other switches |

Similar to the long-distance object detection process, detecting circuit 35 connected to detection lines 35A and 35B generates comparison signal S2 indicating the ratio of the amount of the application of the electric field. Upon receiving comparison signal S2, controller 34 detects the presence or absence of the user's finger by using the ratio of the amount of the application of the electric field of, for example, 10% or more as a threshold.

As described above, every two lower electrode pieces are connected to detection lines 35A, 35B and driving circuit 36 in the middle-distance object detection process. Therefore, the area where an object is detected is smaller than in the long-distance object detection process in which every three lower electrode pieces are connected, and is therefore suitable for the detection in a shorter distance range. The width where an object is detected can be smaller, so that the finger position can be detected more accurately than in the long-distance object detection process.

In the same manner as in time T2 of Table 2, controller 34 performs detection in time T3 at which the connection between the terminals in each switch is changed by shifting lower electrode pieces 2501-2540 by one in the right direction. Controller 34 then performs detection in the same manner in times T4, T5, T6, and T7. Assume that there are 40 lower electrode pieces and that the "n" is 5 or more, or 36 or less. In this case, some lower electrode pieces corresponding to the numerals shown in Table 2 may not be present, and therefore, some control steps and detecting steps are omitted. For example, when there are 50 lower electrode pieces and the "n" is 5 or less, or 46 or more, some control steps and detecting steps are omitted.

The middle-distance object detection process is performed similarly to the long-distance object detection process as follows. Object detection is performed on lower electrode part 25 first, and then performed on upper electrode part 24. When the detection results from electrode parts 24 and 25 indicate that the user's finger is located in the middle distance range, controller 34 determines the position of the finger. Upon detecting the position of the finger, controller 34 controls display element 31, for example, as shown in FIG. 5A.

The following is a description of the short-distance object detection process. In this case, controller 34 controls switching circuit 37 such that every single lower electrode piece is connected to driving circuit 36, detection lines 35A and 35B.

Assume that controller 34 has detected in the middle-distance object detection process that the user's finger is located in lower electrode piece 25n corresponding to switch 37n (n is a positive integer). In this case, in the short-distance object detection process, controller 34 controls the switches in switching circuit 37 as follows as shown in time T8 in Table 3. In switch 37(n−2), terminal S is connected to terminal D1. In switch 37(n−1), terminal S is connected to terminal DR. In switches 37n, terminal S is connected to terminal D2. In the remaining switches, terminal S is connected to terminal NC.

TABLE 3

| time | connection S-D1 | connection S-DR | connection S-D2 | connection S-NC |
|---|---|---|---|---|
| T8 | switch 37(n − 2) | switch 37(n − 1) | switch 37n | the other switches |
| T9 | switch 37(n − 1) | switch 37n | switch 37(n + 1) | the other switches |
| T10 | switch 37n | switch 37(n + 1) | switch 37(n + 2) | the other switches |

Similar to the long- and middle-distance object detection processes, detecting circuit 35 connected to detection lines 35A and 35B generates comparison signal S2 indicating the ratio of the amount of the application of the electric field. Upon receiving comparison signal S2, controller 34 detects the presence or absence of the user's finger by using the ratio of the amount of the application of the electric field of, for example, 10% or more as a threshold.

As described above, every single lower electrode piece is connected to detection lines 35A, 35 and driving circuit 36 in the short-distance object detection process. Therefore, the area where an object is detected is smaller than in the long- and middle-distance object detection processes, and is therefore suitable for the detection in a shorter distance range. The width where an object is detected can be smaller, so that the finger position can be detected more accurately than in the long- and middle-distance object detection processes.

In the same manner as in time T8 of Table 3, controller 34 performs detection in time T9 at which the connection between the terminals in each switch is changed by shifting lower electrode pieces 2501-2540 by one in the right direction. Controller 34 then performs detection in the same manner in time T10.

The short-distance object detection process is performed similarly to the long- and middle-distance object detection processes as follows. Object detection is performed on lower electrode part 25 first, and then performed on upper electrode part 24. When the detection results from these electrode parts 24 and 25 indicate that the user's finger is located in the short distance range, controller 34 determines the position of the finger. Upon detecting the position of the finger, controller 34 controls display element 31, for example, as shown in FIG. 5B.

Thus, controller 34 controls switching circuit 37 so as to detect the object in three different distance ranges in the long-, middle-, and short-distance object detection processes. The degree of approach of the user's finger to touch panel 30 is thus detected, thereby allowing input device 40 to perform diverse operations.

As described above, upper electrode pieces 2401-2420 composing upper electrode part 24, and lower electrode pieces 2501-2540 composing lower electrode part 25 are connected to the respective switches. This facilitates switching between the long-, middle-, and short-distance object detection processes. Furthermore, since controller 34 controls switching circuit 37 by shifting the electrode pieces one by one, the finger position can be detected with high accuracy.

In the above description, detecting circuit 35 is a differential detection circuit which outputs the ratio of the amount of the application of the electric field when detecting the user's finger. Alternatively, detecting circuit 35 can be a detecting circuit not including a differential circuit connected to detection lines 35A and 35B. This detecting circuit uses a threshold for the amount of the application of the electric field. The detecting circuit can detect whether the electric field has been absorbed or not, thus detecting the presence or absence of the user' finger. In the case of using the threshold, the presence or absence of the finger can be detected by providing only one of detection lines 35A and 35B of detecting circuit 35.

It is, however, preferable that detecting circuit 35 is a differential detection circuit because of the following reason. Changes in temperature, humidity, or other conditions in the space into which the electric field ER or EL is discharged may result in changes in the dielectric constant of the space. Even so, in the case that a differential circuit is connected to detection lines 35A and 35B, the differential circuit offsets the changes in the dielectric constant of the space due to the changes in temperature, humidity, and other conditions. As a result, the position of the object can be detected with high accuracy.

Assume that after controller 34 detects the presence of the user's finger, the user brings another finger closer to input device 40. In this case, controller 34 performs long- and middle-distance object detection processes for the upper and lower electrode pieces that are not close to the detected finger. This ensures the detection of the approach of other fingers of the user.

More specifically, assume that the user's finger has been detected over lower electrode piece 2507 corresponding to switch 3707. In this case, as shown in Table 4, controller 34 performs a short-distance object detection process on lower electrode piece 2507 in time T11-T13, and a long-distance object detection process on the lower electrode pieces other than 2507 in times T14-T16.

TABLE 4

| time | connection S-D1 | connection S-DR | connection S-D2 | connection S-NC |
|------|-----------------|-----------------|-----------------|-----------------|
| T11 | switch 3705 | switch 3706 | switch 3707 | the other switches |
| T12 | switch 3706 | switch 3707 | switch 3708 | the other switches |
| T13 | switch 3707 | switch 3708 | switch 3709 | the other switches |
| T14 | switches 3708-3710 | switches 3711-3713 | switches 3714-3716 | the other switches |
| T15 | switches 3709-3711 | switches 3712-3714 | switches 3715-3717 | the other switches |
| T16 | switches 3710-3712 | switches 3713-3715 | switches 3716-3718 | the other switches |

In the above description, the user's finger is detected in three different distance ranges. Alternatively, the finger may be detected in four or more different distance ranges, or in a much longer distance range by controlling every four or more upper or lower electrode pieces as a unit.

In the above description, the user's finger is described as the object to be detected. Alternatively, any other object can be used as long as it can change the electric field, such as a stick or pen made of material which affects the electric field.

In the above description, touch panel 30 includes upper electrode part 24 formed of upper electrode pieces 2401-2420 arranged in the right-and-left direction, and lower electrode part 25 formed of lower electrode pieces 2501-2540 arranged at right, angles thereto. In some cases, however, the object can be detected by detecting its position either in the right-and-left, direction or in the front-and-back direction, in such cases, it is possible to provide only either upper electrode part 24, that is, upper electrode pieces 2401-2420, or lower electrode part 25, that is, lower electrode pieces 2501-2540.

As described above, input device 40 includes electrode parts 24 and 25, switching circuit 37, driving circuit 36, detecting circuit 35, and controller 34. Electrode parts 24 and 25 are formed of electrode pieces 2401-2420 and 2501-2540, respectively. Switching circuit 37 is formed of switches 3701-3760 connected to electrode pieces 2501-2540 and 2401-2420, respectively. Driving circuit 36 and detecting circuit 35 are connected to electrode parts 24 and 25 via switching circuit 37. Controller 34 is connected to driving circuit 36, switching circuit 37, and detecting circuit 35. Controller 34 controls the respective switches such that the electrode pieces are individually opened or connected to one of driving circuit 36 and detecting circuit 35. Then, controller 34 allows generating an electric field over at least one of the electrode pieces, which is connected to driving circuit 36. The electric field is applied to detecting circuit 35 through at least one of the electrode pieces, which is connected to detecting circuit 35 via the space over electrode parts 24 and 25. Controller 34 then determines the electrode piece to which the object to be detected has gotten close, among the electrode pieces, based on the detection result of detecting circuit 35.

Thus, in input device 40, controller 34 controls each switch such that every predetermined number of upper electrode pieces 2401-2420 or lower electrode pieces 2501-2540 are opened or connected to one of driving circuit 36 and detecting circuit 35. Therefore, it is possible to perform the control according to the distance between the object to be detected such as the user' finger and the electrode pieces composing upper or lower electrode part 24 or 25. This enables input device 40 to perform easy and diverse operations.

As described above, detecting circuit 35 is preferably differential detection circuit because of the following reason. Changes in temperature, humidity, or other conditions in the space into which the electric field ER or EL is discharged may result in changes in the dielectric constant of the space. Even so, in the case that a differential circuit is connected to detection lines 35A and 35B, the differential circuit offsets the changes in the dielectric constant of the space due to the changes in temperature, humidity, and other conditions. As a result, the position of the object can be detected with high accuracy.

It is also preferable that controller 34 controls switching circuit 37 such that of the electrode pieces, the number of electrode pieces connected to driving circuit 36 decreases following a decrease in distance between the object to be detected and the electrode part. This strikes a balance between the distance range in which the object can be detected and the accuracy of the position of the object. As a result, the input, device can detect the position of the object with high accuracy.

Controller 34 preferably controls switching circuit 37 such that of the electrode pieces, the number of electrode pieces connected to driving circuit 36 at a first position close to the object to be detected is greater than the number of electrode pieces connected to driving circuit 36 at a second position farther from the object than the first position. In this case, controller 34 determines, based on a detection result of detecting circuit 35, an electrode piece, among the electrode pieces, to which a second object to be detected has gotten close around the second position. As a result, the long- and middle-distance object detection processes can be performed for another object if it is located at the second position in which the preceding object has not been detected. Thus, the position on which the second object is placed or toward which the second object is moved can be detected efficiently while the first position is detected. This ensures the detection of a plurality of objects in succession.

As described hereinbefore, the input device of the present invention, which performs easy and diverse operations, is suitable for operating various electronic apparatuses.

What is claimed is:

1. An input device comprising:
    an electrode part formed of electrode pieces;
    a switching circuit formed of a plurality of switches connected to the electrode pieces respectively;
    a driving circuit and a detecting circuit both of which are connected to the electrode part via the switching circuit; and
    a controller connected to the driving circuit, the switching circuit, and the detecting circuit;
    wherein the controller controls the switching circuit such that among the plurality of electrode pieces, the number of electrode pieces connected to the driving circuit decreases following a decrease in distance between an object to be detected and the electrode part;
    wherein the controller controls the respective switches such that the electrode pieces are individually opened or connected to one of the driving circuit and the detecting circuit;
    wherein the controller allows generating an electric field over at least a first one of the electrode pieces, the at least first one of the electrode pieces being connected to the driving circuit; and
    wherein the electric field is applied to the detecting circuit through at least a second one of the electrode pieces via a space over the electrode part, the at least second one of the electrode pieces being connected to the detecting circuit.

2. The input device according to claim 1,
    wherein the detecting circuit is a differential detection circuit.

3. The input device according to claim 1,
    wherein the controller controls the switching circuit such that among the plurality of electrode pieces, the number of electrode pieces connected to the driving circuit at a first position close to the object to be detected is greater than the number of electrode pieces connected to the driving circuit at a second position farther from the object to be detected than the first position, and
    the controller determines, based on a detection result of the detecting circuit, an electrode piece, among the electrode pieces, to which a second object to be detected has gotten close around the second position.

4. The input device according to claim 1, wherein
    the controller determines, based on a detection result of the detecting circuit, an electrode piece, among the electrode pieces, to which the object to be detected has gotten close.

5. The input device according to claim 1, wherein the controller controls the switching circuit so that, as distance between the object to be detected and the electrode decreases, accuracy in detecting the position of the object to be detected increases.

6. An input device comprising:
    an electrode part formed of electrode pieces;
    a switching circuit formed of a plurality of switches connected to the electrode pieces respectively;
    a driving circuit and a detecting circuit both of which are connected to the electrode part via the switching circuit; and
    a controller connected to the driving circuit, the switching circuit, and the detecting circuit;
    wherein the controller controls the switching circuit such that among the plurality of electrode pieces, the number of electrode pieces connected to the driving circuit at a first position close to a first object to be detected is greater than the number of electrode pieces connected to the driving circuit at a second position farther from the first object to be detected than the first position;
    wherein the controller determines, based on a detection result of the detecting circuit, an electrode piece, among the electrode pieces, to which a second object to be detected has gotten close around the second position;
    wherein the controller controls the respective switches such that the electrode pieces are individually opened or connected to one of the driving circuit and the detecting circuit;
    wherein the controller allows generating an electric field over at least a first one of the electrode pieces, the at least first one of the electrode pieces being connected to the driving circuit; and
    wherein the electric field is applied to the detecting circuit through at least a second one of the electrode pieces via a space over the electrode part, the at least second one of the electrode pieces being connected to the detecting circuit.

7. The input device according to claim 6,
    wherein the detecting circuit is a differential detection circuit.

8. The input device according to claim 6, wherein
    the controller determines, based on a detection result of the detecting circuit, an electrode piece, among the electrode pieces, to which the first object to be detected has gotten close.

* * * * *